United States Patent
Suzuki

(10) Patent No.: US 6,745,669 B2
(45) Date of Patent: Jun. 8, 2004

(54) FRYER

(75) Inventor: Akira Suzuki, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/641,843

(22) Filed: Aug. 15, 2003

(65) Prior Publication Data

US 2004/0035299 A1 Feb. 26, 2004

(30) Foreign Application Priority Data

Aug. 26, 2002 (JP) ........................................ 2002-245407

(51) Int. Cl.$^7$ ................................................ A47J 37/12
(52) U.S. Cl. .............................. 99/330; 99/331; 99/332; 99/342; 99/403; 99/408; 126/374.1; 126/391.1; 210/167; 210/DIG. 8
(58) Field of Search .......................... 99/325–334, 337, 99/338, 342, 403–410; 126/391.1, 389.1, 390.1, 378.1, 374.1, 369; 210/167, DIG. 8; 219/492, 494, 497, 506, 508, 442, 486, 510, 512; 426/231–233, 438, 519, 808; 431/326.1, 170; 700/90, 99, 85, 300; 34/589; 705/14, 16; 709/219, 223, 203, 238

(56) References Cited

U.S. PATENT DOCUMENTS

| | | | |
|---|---|---|---|
| 4,688,475 A | 8/1987 | Witt et al. | |
| 4,890,548 A | 1/1990 | Grob et al. | |
| 4,899,649 A | 2/1990 | Grob et al. | |
| 4,974,501 A | 12/1990 | Grob et al. | |
| 5,060,559 A | 10/1991 | Winter | |
| 5,261,322 A | * 11/1993 | Yokoyama et al. | ............ 99/330 |
| 5,297,474 A | * 3/1994 | Tabuchi | ........................ 99/344 |
| 5,404,799 A | * 4/1995 | Bivens | ......................... 99/408 |
| 5,417,851 A | * 5/1995 | Yee | .............................. 210/167 |
| 5,617,777 A | * 4/1997 | Davis et al. | ................... 99/408 |
| 5,680,811 A | * 10/1997 | Highnote et al. | .............. 99/408 |
| 5,731,024 A | * 3/1998 | Bivens | ......................... 426/417 |
| 5,823,097 A | * 10/1998 | Dirck | ........................... 99/408 |
| 5,870,945 A | * 2/1999 | Bivens | ......................... 99/408 |
| 6,090,276 A | * 7/2000 | Ford | ........................... 210/167 |
| 6,095,037 A | * 8/2000 | Savage et al. | ................. 99/408 |
| 6,235,210 B1 | * 5/2001 | Saksena | ...................... 210/791 |
| 6,470,794 B2 | * 10/2002 | Takahashi | ..................... 99/408 |

* cited by examiner

*Primary Examiner*—Timothy F. Simone
(74) *Attorney, Agent, or Firm*—Burr & Brown

(57) ABSTRACT

A fryer which notifies an appropriate oil filtering timing is disclosed. While various kinds of cooking is repeated, the degree of amount of fry residues set previously in accordance with menu switch is accumulated every time each menu switch (M1–M5, M7–M11) is pressed (S3–S12, S13: NO, S14: NO). When an accumulative value of amount of accumulated fry residues N is over 50(S14: YES), a notification for filtering timing is performed by blinking a filtering sign "*" at the right side of the display portion 14 (S15). In this way, the oil filtering timing is determined based on an estimated amount of fry residues. Therefore, the notification is performed appropriately.

2 Claims, 4 Drawing Sheets

FRYER

This application claims the benefit of Japanese Application Number 2002-245407 filed Aug. 26, 2002, the entirety of which is incorporated by reference.

BACKGROUND OF THE INVENTION

1. Field of the Invention

The present invention relates to a fryer for heating and cooking foods with cooking oil filled into an oil vat.

2. Prior Art

Conventionally, a fryer used for frying foods in fast food restaurants for example, has a controller stored with various controlling programs for cooking and an operation panel for instructing an operation of the controlling programs for cooking. This operation panel includes a display portion for displaying a cooking menu, a temperature of cooking oil (hereinafter simply referred to as oil), and the remaining time of a cooking timer and the like, and various switches such as an operation switch and a menu switch for starting a cooking timer set in accordance with each cooking menu.

In such a fryer, when a temperature of oil filled in an oil vat reaches a predetermined temperature range, a menu switch is pressed to start a cooking timer along with putting foods, for example potatoes, into heated oil in an oil vat. At this operation, as oil is deteriorated by fry residues of foods etc., an oil cleaner is provided for filtering the oil.

Further, an inexperienced or busy user might forget filtering the oil or miss a timing of the filtering. In order to prevent the above, a display portion displays a filtering sign for notifying and encouraging oil filtering by the oil cleaner at preset time intervals.

However, since the filtering sign is displayed simply after a preset time has elapsed, there is a problem that the filtering sign is displayed even when cooking is not carried out, that is, fry residues are not accumulated so much.

There is another fryer notifying a filtering timing based on the number of times each menu switch is pressed in order to solve this problem. In other words, there is a fryer in which the notification is performed when the number of which each menu switch is pressed exceeds individual standard times set in accordance with each menu switch or the number of which all menu switches are pressed exceeds preset total standard times.

However, the notification is performed only by the number of times of cooking although the amount of fry residues varies depending on the kind of cooking. Thus, there is another problem that the timing of the notification is missed in a plurality of cooking, unlike single cooking in which the notification for filtering timing is performed appropriately. For example, in the event that cooking which produces plenty of fry residues is repeatedly performed, the amount of fry residues in the oil vat becomes excessive when all menu switches are pressed over total standard times. On the other hand, in the event that cooking which produces a small amount of fry residues is repeatedly performed, fry residues in an oil vat are not accumulated so much when all menu switches are pressed over total standard times.

The present invention solves the aforementioned problems, and an object of the present invention is to provide a fryer which notifies the timing of oil filtering appropriately.

SUMMARY OF THE INVENTION

To achieve the above-mentioned object, in accordance with a first aspect of the present invention, a fryer comprising:

an oil vat for containing cooking oil;

a heating means for heating the cooking oil;

a filtering device for filtering the cooking oil;

a plurality of cooking timers for counting cooking time set in accordance with each cooking menu and notifying the termination of cooking when the cooking time elapsed, and a start switch for selecting and starting a cooking timer for an arbitrary cooking menu, wherein the fryer comprising a storage means for storing a degree of amount of fry residues expected to be produced in the oil vat by single cooking for each cooking menu, and an accumulative means for accumulating the degree of amount of fry residues in accordance with each cooking menu corresponding to the cooking timers read from the storage means at each cooking timer's operation, and a notification means for notifying the timing of filtering the cooking oil when the accumulated degree of amount of fry residues reaches a predetermined value.

According to a second aspect of the present invention, there is provided a fryer according to the first aspect, further comprises a prohibition means for prohibiting an ON operation of the cooking timers when the accumulated degree of amount of fry residues reaches a standard value which is more than the predetermined value.

In a fryer according to a first aspect of the present invention with the above configuration, a preset degree is accumulated corresponding to the amount of fry residues in accordance with each cooking menu at each cooking timer's operation. When the accumulative value reaches a predetermined value, the notifying means notifies the timing for filtering. In other words, the filtering notification is performed in an appropriate timing because it reflects not only the number of cooking times but a difference of the amount of fry residues produced in each cooking menu.

In a fryer according to a second aspect of the present invention, the prohibition means prohibits the ON operation of the cooking timer when the degree of the fry residues reaches the standard value. That is, to prevent the fry residues from accumulating because filtering is not conducted in spite of the notification of filtering, the prohibition means is carried out not only by notifying but by locking the cooking timer. As a result, the next cooking timer cannot start unless filtering is conducted.

DESCRIPTION OF THE PREFERRED EMBODIMENTS

The configuration and operation of the present invention as described above will become clearer through the following description of a preferred embodiment of the fryer of the present invention with reference to FIGS. 1–4.

Figure 2:
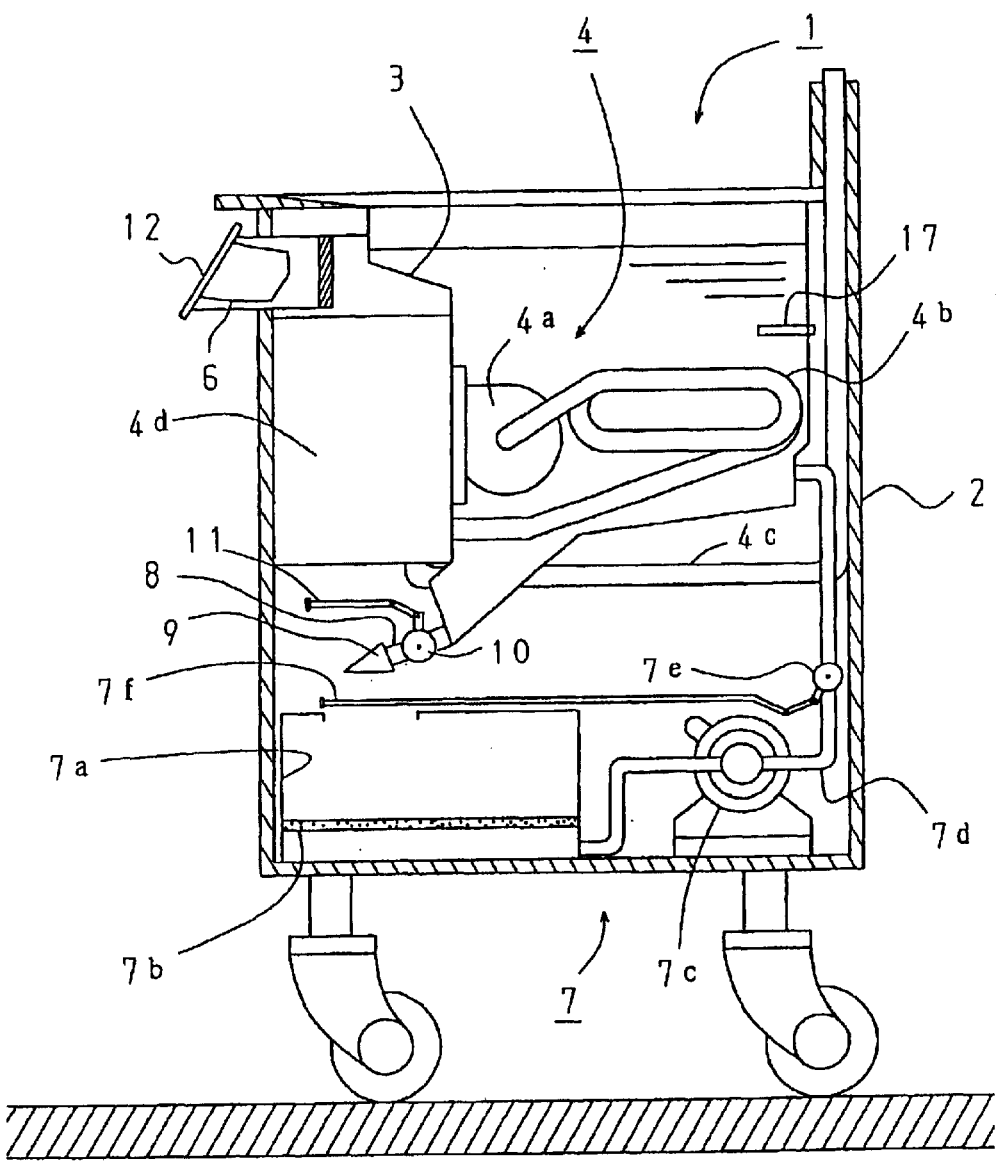
FIG. 2 is a schematic view of a fryer according to the present embodiment.

FIG. 2 is a schematic view of an industrial fryer (hereinafter, simply referred to as a fryer) according to an embodiment of the present invention.

A fryer 1 has a casing 2, which includes an oil vessel 3 filled with cooking oil for frying foods, a pulse burner 4 for heating the oil, a heating controller for controlling the operation of the pulse burner 4 so that the temperature of the oil is maintained at the set temperature (not shown), a cooking controller 6 for alarming an end of cooking timers installed therein for each cooking menu, and an oil cleaner 7 for filtering the oil in the oil vessel 3.

The bottom surface of the oil vessel 3 is inclined downward from the backside to the front side of the fryer 1. An exhaust pipe 8 for oil discharge is provided at the front of the deepest portion of the oil vessel 3 and an outlet 9 is provided at the tip of the exhaust pipe. The exhaust pipe 8 has an exhaust valve 10 which has an exhaust valve lever 11 for opening/closing operation of the exhaust valve 10.

A pulse burner 4 includes a combustion/exhaust system with a combustion chamber 4a which is disposed within the oil vessel 3 and in which pulse combustion is taken place, a tail pipe 4b being a discharge passage for a high-temperature exhaust gas from combustion chamber 4a, a decoupler(not shown in the drawings)provided on the downstream side of the tail pipe 4b, and an exhaust pipe 4c disposed on the downstream side of the decoupler. Furthermore, a chamber 4d is disposed adjacent to the combustion chamber 4a. This chamber 4d includes an air chamber, a gas chamber, and a fuel-air mixing chamber. From the chamber 4d, a mixture of fuel gas and air is supplied to the combustion chamber 4a.

The oil cleaner 7 is composed of an oil tank 7a provided below the oil discharge opening 9, an oil filter 7b spread out in a planar shape slightly above the bottom portion of the oil tank 7a, an oil pump 7c for drawing up oil which has passed through the oil filter 7b and returning that oil to the oil vat 3, and an oil pipe 7d which forms a duct for this circulation passage. An oil supply valve 7e is provided with the oil pipe 7d which is on the downstream side of the oil pump 7c. The oil supply valve 7e includes an oil supply valve lever 7f for opening/closing operation of the oil supply valve 7e.

To filter the oil in the oil vessel 3, first the discharge valve lever 11 is operated to open the discharge valve 10 to let oil fall into the oil tank 7a. After the discharge valve 10 is closed, the oil supply valve lever 7f is operated to open the oil supply valve 7e. By driving the oil pump 7c, oil cleaned through the oil filter 7b is returned to the oil vessel 3.

It should be noted that an ON/OFF operation of a power supply of the oil pump 7c is linked with the operation of the oil supply lever 7f. That is, the oil pump 7c is switched ON when the oil supply lever 7f is opened, while oil pump 7c is switched OFF when the oil supply lever 7f is closed.

The cooking controller 6 has the primary part configured by a microcomputer, and an operation panel 12 is provided at the front of the casing 2. Within the cooking controller 6 a buzzer is provided for alarming when the cooking timer is terminated.

Figure 3:
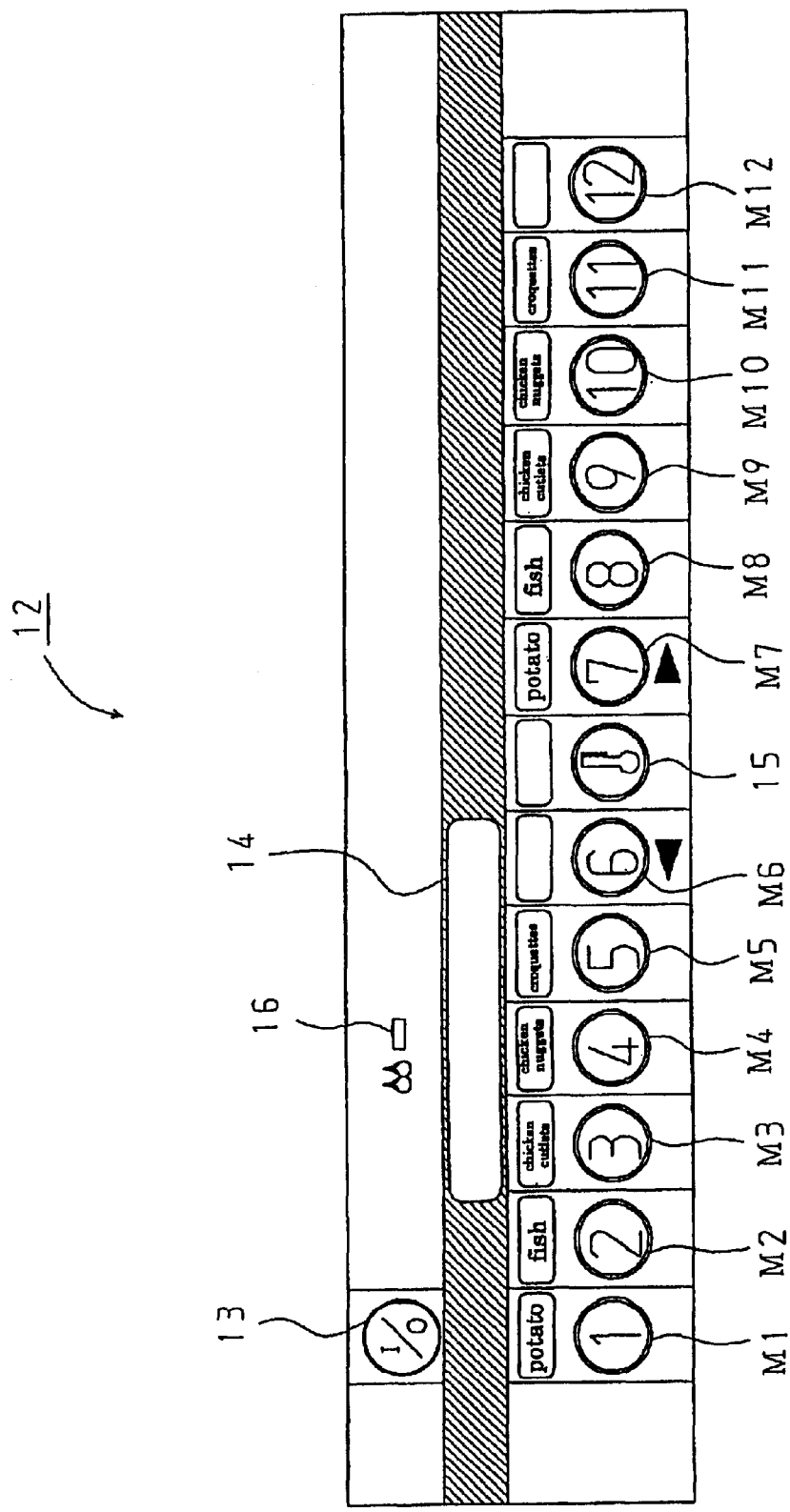
FIG. 3 is a front view of a display panel according to the present embodiment.

FIG. 3 is a front view of the display panel 12. The display portion 12 which includes an operation switch 13 for performing ON/OFF operation of the fryer 1, a display portion 14 for displaying the cooking menus, the oil temperature and remaining time of the cooking timers and the like, a changeover switch 15 for alternating displays of the display portion 14, a combustion lamp 16 for emitting a light during an operation of the pulse burner 4, menu switches M1–M12 for setting the cooking timers for the preset time according to each cooking menu. It should be noted that menu switches M1–M2 correspond to start switches in the present invention.

Each of the switches M1–M12 has a cooking menu display at the upper portion thereof and has a menu number display at the center thereof respectively. In addition, an LED is installed at the backside of the operation switch 13 and each of the switches M1–M12 respectively, and when each of the switches is pressed the LED is lighted.

The heating controller which is provided at the front of the casing 2 (not shown in the drawings) has the primary part configured by a microcomputer. The heating controller is connected on its input side to the temperature sensor 17 provided with the oil vessel 3 and is connected on its output side to a gas magnet valve and a fan motor, etc. Further, the heating controller is connected to the cooking controller 6 which includes the operation switch 13. In response to ON control of the operation switch 13, the heating controller performs ON/OFF control of the pulse burner 4 so as to maintain the oil temperature at a setting level (340° F.=approximately 171.1° C.).

Now the operation of the above-described fryer will be described below.

With the above-described fryer, oil is filled into the oil vessel 3, and once the operation switch 13 is turned on, the pulse burner 4 starts to heat the oil and maintains a temperature of the oil at a setting level (340° F.). Then when each menu switch corresponding to the cooking menu respectively is turned on, each cooking timer starts to count the set time differently determined by each cooking menu, and the cooking is started by putting foods into the oil vessel 3. In other words, the set temperature is fixed, while the cooking time varies in accordance with each cooking menu. Further, an LED is lighted when the corresponding menu switch is pressed. When the time of the cooking timer terminates, an alarm goes off to notify completion of cooking and then cooked foods are taken out of the oil vessel 3.

In this fryer, as plural menu switches are provided, several kinds of cooking can be done at the same time by putting several kinds of foods into the oil vessel 3. That is, even while one cooking is on-going, a user can carry out another kind of cooking at the same time by putting foods into the oil for another cooking. In this case, a menu switch is pressed every time when foods for another cooking are put into the oil vessel, whereby completion of each cooking can be checked by a termination of each cooking timer.

Menu switches M1–M12 are used for various kinds of cooking: M1 and M7 for fried potatoes, M2 and M8 for fried fish, M3 and M9 for chicken cutlets, M4 and M10 for chicken nuggets, M5 and M11 for croquettes. Each of the above pair of menu switches, for example, M1 and M7, has a cooking timer counting the same set time. Moreover, since there are two menu switches for one cooking menu, for example, fried potatoes, two cooking for fried potatoes can be carried out at the same time. Lastly, menu switches M6 and M12 are spare switches.

Next, a display of notification for filtering timing will be described below.

Figure 4:
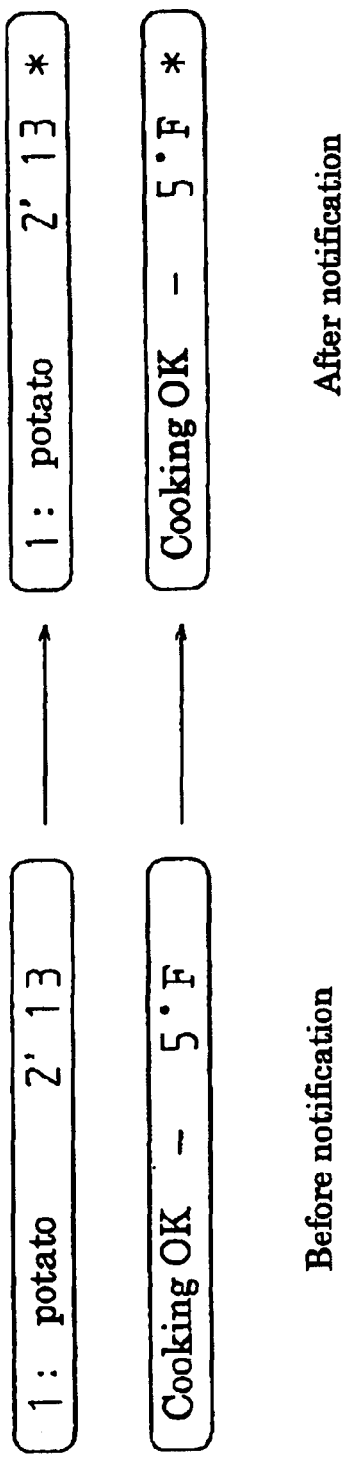
FIG. 4 is an illustrative view of a display state of a display portion according to the present embodiment.

With reference to FIG. 4, on the display portion 14, displays such as "1: potato 2'13" and "cooking OK—5° F." blink. "1: potato 2'13" means that a cooking timer of menu 1 for potato is counting and its remaining time is 2 minutes and 13 seconds. "cooking OK—5° F." means that a cooking timer is not counting and the oil temperature is below the set temperature (340° F.) by 5° F.

As oil is degraded due to repeated cooking, it is necessary to filter the oil by the oil cleaner 7. At this time, as shown in FIG. 4, a filtering sign "*" blinks at the right side of the display portion 14 to notify a user.

Now notification of filtering timing will be described below.

As a certain amount of fry residues is produced in one cooking for a cooking menu, the cooking controller 6 can store the degree of amount of fry residues expected to be produced in each cooking menu. Then the cooking controller 6 accumulates the degree every time a menu switch is pressed so that notification is performed when the accumulative value reaches a predetermined value. The degree of amount of fry residues is set 50 as a value necessary for oil filtering.

Specifically, each cooking menu has different values of amount of fry residues stored in cooking controller 6 as follows: the value of M1 and M7 for potatoes is 3, the value of M2 and M8 for fried fish is 7, the value of M3 and M9 for chicken cutlet is 10, the value of M4 and M10 for chicken nuggets is 3, the value of M5 and M11 for croquettes is 8.

When the accumulative value exceeds 50, it is judged that fry residues are accumulated over a predetermined amount, and a display "*" blinks as a filtering sign on the display portion 14 in order to encourage the oil filtration.

Further, the accumulative value might reach a prohibition value (for example, 75) because cooking is continued without filtering even if a notification for filtering timing is performed by a filtering sign. In this case, it becomes impossible to turn ON a cooking timer and start cooking unless a filtering is conducted. It should be noted that a display portion 14 changes over its display to "cooking is prohibited".

Figure 1:
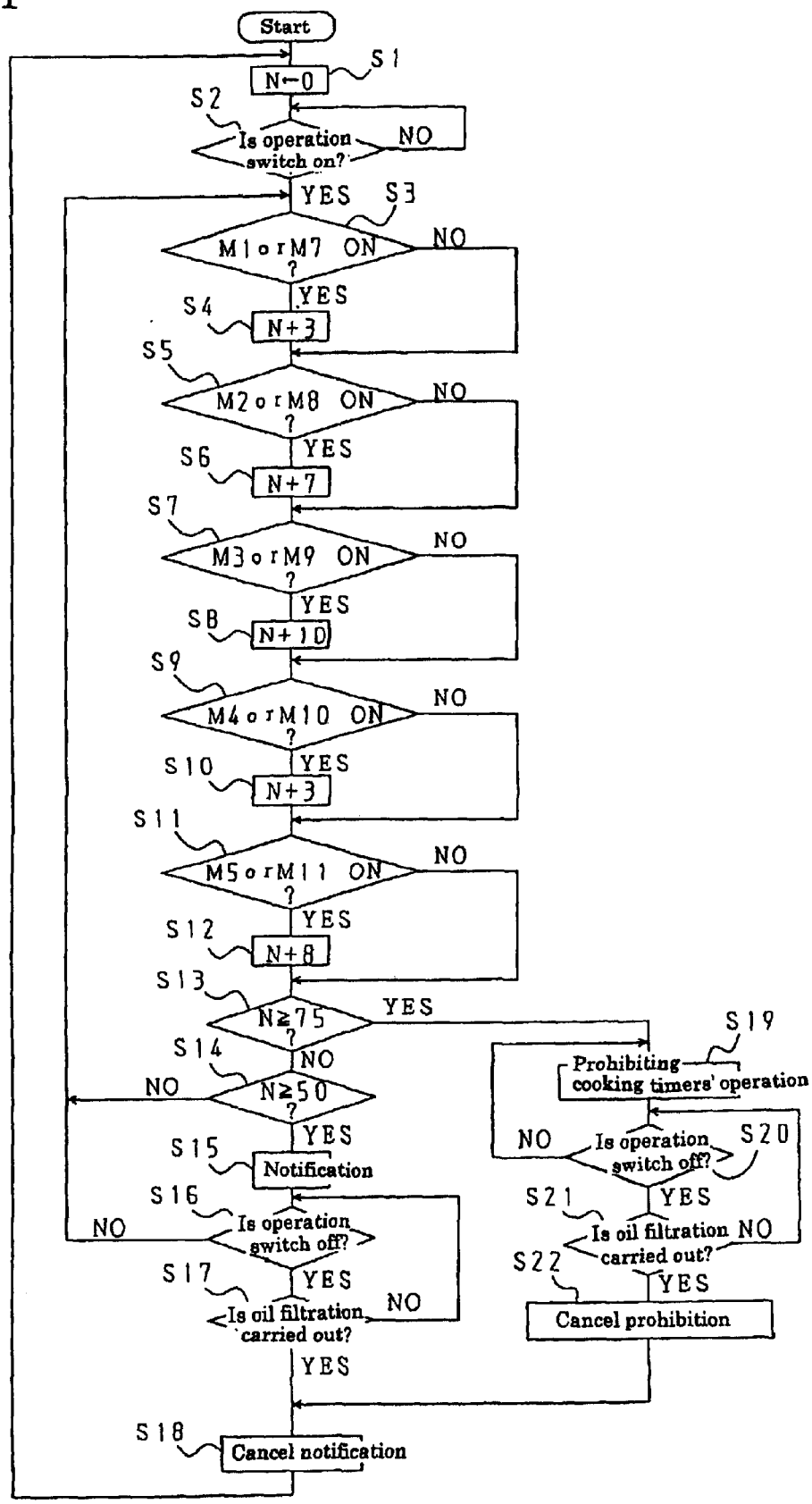
FIG. 1 is a flow chart of a process for filtering notification performed by a cooking controller according to the present embodiment.

Next, a process of the above-described notification for filtering timing by the cooking controller 6 will be explained with reference to a flow chart of FIG. 1.

When an electric plug of an appliance is inserted into a wall socket of 100V, power is supplied to the appliance and a main routine starts to drive. Then an accumulative value of amount of fry residues N is set for 0(S1) and an operation switch is pressed to start ON operation (S2: YES). Subsequently, the degree of amount of fry residues stored in accordance with menu switch is accumulated every time each menu switch (M1–M5, M7–M11) is pressed. The degree is determined by each menu as follows: the degree of M1 and M7 is 3, the degree of M2 and M8 is 7, the degree of M3 and M9 is 10, the degree of M4 and M10 is 3 and the degree of M5 and M11 is 8 (S3–S12, S13: NO, S14: NO).

After repeating various cooking, when an accumulative value of amount of fry residues N is over 50(S14: YES), a notification for filtering timing is performed by blinking a filtering sign "*" at the right side of the display portion 14 to notify a user(S15).

When it is judged that filtering is completed(S17: YES), a filtering sign disappears and notification is terminated (S18) and it goes back to step 1 and an accumulative value of amount of fry residues N is set for 0.

Moreover, detection of filtering will be described below. To filter the oil by the oil cleaner 7, a user turns OFF the operation switch 13 to stop the combustion of the pulse combustion burner 4. After that, the oil is dropped into the oil tank 7a and then the oil is cleaned through the oil filter 7b and returned to the oil vessel 3 by the oil pump 7c. At this operation, completion of filtering is detected when the oil pump 7c is turned off after turned on.

However, there is a possibility that the filtering is not conducted despite the notification of filtering timing at step 15. For example, the cooking controller 6 may be on-going without an OFF operation (S16: NO) or the cooking controller may be turned ON again without filtering after an OFF operation is once performed (S17: NO). In such a case, a value of amount of fry residues N is accumulated with notification of a filtering sign "*". It should be noted that if filtering is conducted while the pulse combustion 4 is under operation, it might lead to heating the empty oil vessel 3. Accordingly, a buzzer goes off to notify the above situation when the exhaust valve 10 is opened during an ON operation of the cooking controller 6.

When an accumulative value of amount of fry residues N is over 75 (S13: YES), another operation of the cooking timer is prohibited (S19). That is, when the accumulative value exceeds 75, it is judged that the oil is extremely degraded and another operation of a cooking timer is prohibited compulsory. Note that the cooking timer which has been already started when the accumulative value reaches the above value continues to counting till a termination of its remaining time.

The prohibition of the cooking timer continues until it detects that the filtering is conducted as described above (S20: NO or S21: NO).

When it detects the filtering is conducted (S21: YES), the prohibition of the cooking timer is canceled (S22) and the notification is stopped by eliminating the filtering sign "*" (S18), and it goes back to step 1 and an accumulative value of amount of fry residues N is set for 0.

As described above, according to a fryer 1 of the present embodiment, it is possible to determine the timing of notification of the filtering by weighting the amount of fry residues produced in one cooking set in accordance with each cooking menu. In other words, the timing is determined considering not only number of times of cooking but the difference of amount of fry residues actually produced in cooking for each menu. This means that the notification of filtering timing is performed appropriately based on an amount of fry residues expected to be produced in cooking so far.

Accordingly, the filtering timing is always performed appropriately, whereby the oil deterioration is prevented and cooking efficiency is improved. Moreover, the filtering in appropriate timing prevents fry residues from accumulating excessively. As a result, an inconvenience that the exhaust pipe 8 is stuffed with the fry residues can be reduced. Further, it is unlikely that filtering is conducted when the oil is not so deteriorated, which improves the work efficiency so as to be cost-effective.

Further, even when a user ignores a notification and continues cooking, cooking is prohibited by stopping an operating cooking timer. As a result, the oil filtering is conducted compulsory. Thus even if an immature worker, such as a part-time worker in a fast food restaurant, does not find or ignores the notification, it is possible to maintain a indispensable quality of cooked food state to customers. Moreover, since there is a certain period between the notification and the prohibition of cooking, the operation can be continued until a good stopping timing. That is, the cooking can be continued for a certain period before filtering even if the notification is performed when a user is busy. As a result, the inconvenience of keeping customers waiting is resolved.

The above description of embodiment of the present invention has in no way been provided for the purpose of limiting the present invention, and it is of course possible to diversely embody the present invention within the scope that does not depart from the essential points of the present invention.

For example, a buzzer installed within the cooking controller 6 may be used as a notification means for notifying filtering timing. That is, when an accumulative value of amount of fry residues N is over 50, the notification of filtering timing may be performed by the buzzer alarming for a predetermined time (for example, one minute).

Additionally, in the fryer 1 of the present embodiment there is provided a certain period between the notification and the prohibition of cooking. However, the notification and the prohibition of cooking may be performed at the same time without the certain period.

As described above, in a fryer according to a first aspect of the present invention, the timing for oil filtering is determined based on an estimated amount of fry residues. Therefore, the notification is performed appropriately. This makes it possible to properly prevent oil deterioration and improve cooking efficiency.

In a fryer according to a second aspect of the present invention, a start of another cooking timer is prohibited when an estimated amount of fry residues reaches a preset standard value. Consequently, filtering can be performed compulsory. This means that the filtering operation is surely performed even if a user does not find or ignores the notification. As a result, it is possible to maintain an indispensable quality of cooked food state.

What is claimed is:

1. A fryer comprising:

an oil vat for containing cooking oil;

a heating means for heating the cooking oil;

a filtering device for filtering the cooking oil;

a plurality of cooking timers for counting cooking time set in accordance with each cooking menu and notifying the termination of cooking when the cooking time elapsed, and a start switch for selecting and starting a cooking timer for an arbitrary cooking menu, wherein the fryer comprising a storage means for storing a degree of amount of fry residues expected to be produced in the oil vat by single cooking for each cooking menu, and an accumulative means for accumulating the degree of amount of fry residues in accordance with each cooking menu corresponding to the cooking timers read from the storage means at each cooking timer's operation, and a notification means for notifying the timing of filtering the cooking oil when the accumulated degree of amount of fry residues reaches a predetermined value.

2. A fryer according to claim 1, further comprises a prohibition means for prohibiting an ON operation of the cooking timers when the accumulated degree of amount of fry residues reaches a standard value which is more than the predetermined value.

* * * * *